US007971102B2

(12) United States Patent
Purrington et al.

(10) Patent No.: US 7,971,102 B2
(45) Date of Patent: Jun. 28, 2011

(54) PREEMPTIVE THERMAL MANAGEMENT FOR A COMPUTING SYSTEM BASED ON CACHE PERFORMANCE

(75) Inventors: Challis L. Purrington, Raleigh, NC (US); Michael L. Scollard, Raleigh, NC (US); Victor A. Stankevich, Cary, NC (US); Ivan R. Zapata, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 11/960,599

(22) Filed: Dec. 19, 2007

(65) Prior Publication Data

US 2009/0164852 A1 Jun. 25, 2009

(51) Int. Cl.
*G06F 11/00* (2006.01)
(52) U.S. Cl. .......................................... 714/47; 702/132
(58) Field of Classification Search ..................... 714/47; 702/132
See application file for complete search history.

(56) References Cited

U.S. PATENT DOCUMENTS

| | | | | | |
|---|---|---|---|---|---|
| 5,745,737 | A | * | 4/1998 | Kayes et al. ..................... | 703/13 |
| 5,974,438 | A | * | 10/1999 | Neufeld ......................... | 718/104 |
| 6,029,119 | A | * | 2/2000 | Atkinson ....................... | 702/132 |
| 6,513,124 | B1 | * | 1/2003 | Furuichi et al. ................ | 713/322 |
| 6,772,352 | B1 | * | 8/2004 | Williams et al. ............... | 713/300 |
| 7,099,735 | B2 | * | 8/2006 | Jain et al. ....................... | 700/132 |
| 7,191,088 | B1 | * | 3/2007 | Reed et al. ..................... | 702/130 |
| 2002/0055961 | A1 | * | 5/2002 | Chauvel et al. ............... | 708/100 |
| 2003/0225556 | A1 | * | 12/2003 | Zeidman ........................ | 703/14 |
| 2004/0128635 | A1 | * | 7/2004 | Sahara et al. .................. | 716/6 |
| 2004/0267409 | A1 | * | 12/2004 | De Lorenzo et al. ......... | 700/299 |
| 2005/0216775 | A1 | * | 9/2005 | Inoue ............................ | 713/300 |
| 2005/0217300 | A1 | * | 10/2005 | Cheng et al. .................. | 62/259.2 |
| 2005/0223250 | A1 | * | 10/2005 | Paver ............................. | 713/322 |
| 2005/0288902 | A1 | | 12/2005 | Coulson et al. | |
| 2006/0004537 | A1 | * | 1/2006 | Jain et al. ....................... | 702/132 |
| 2006/0195708 | A1 | | 8/2006 | Kato et al. | |

FOREIGN PATENT DOCUMENTS

WO    WO 2006/106890 A1    10/2006

OTHER PUBLICATIONS

Sung Woo Chung; Skadron, K.; , "Using On-Chip Event Counters for High-Resolution, Real-Time Temperature Measurement," Thermal and Thermomechanical Phenomena in Electronics Systems, 2006. ITHERM '06. The Tenth Intersociety Conference on , vol., No., pp. 114-120, May 30-Jun. 2, 2006.*

* cited by examiner

*Primary Examiner* — Scott T Baderman
*Assistant Examiner* — Chae Ko
(74) *Attorney, Agent, or Firm* — Brandon C. Kennedy; Cynthia G. Seal; Biggers & Ohanian, LLP (57) ABSTRACT

Methods, apparatus, and products are disclosed for preemptive thermal management for a computing system based on cache performance, the computing system having a processor, cached computer memory operatively coupled to the processor, and a processor cache operatively coupled to the processor, the processor cache capable of storing a subset of memory contents of the cached computer memory, that include: attempting, by the processor, to retrieve portions of the memory contents of the cached computer memory from the processor cache, resulting in cache misses for the processor cache; tracking, by the processor, cache miss statistics for the processor cache in the computing system, the cache miss statistics describing the cache misses for the processor cache; and administering a thermal management device for the computing system in dependence upon the cache miss statistics, the thermal management device operatively coupled to the processor and capable of managing temperature for the computing system.

15 Claims, 3 Drawing Sheets

PREEMPTIVE THERMAL MANAGEMENT FOR A COMPUTING SYSTEM BASED ON CACHE PERFORMANCE

BACKGROUND OF THE INVENTION

1. Field of the Invention

The field of the invention is data processing, or, more specifically, methods, apparatus, and products for preemptive thermal management for a computing system based on cache performance.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

In order to deliver powerful computing resources, computer architects must design powerful computer processors and high-speed memory modules. Current high-speed memory modules, for example, may operate well beyond a billion cycles per second. Operating these computer processors and memory modules requires a significant amount of power, which creates increasingly challenging thermal management considerations. Current cooling solutions monitor temperature sensors either on devices or sensors that detect exhaust airflow temperatures. After these temperatures exceed certain thresholds, current solutions invoke external processes or mechanisms to increase the amount of cooling in an effort to reduce overall the temperature. The drawback to these solutions, however, is that such solutions respond to temperature increases after the increases in temperature have actually occurred. Often the lag time between the cooling system's response and any effect of the response on the temperature results in temperature thresholds being exceeded, warning messages being generated, or in more extreme cases thermal shutdown or failure.

SUMMARY OF THE INVENTION

Methods, apparatus, and products are disclosed for preemptive thermal management for a computing system based on cache performance, the computing system having a processor, cached computer memory operatively coupled to the processor, and a processor cache operatively coupled to the processor, the processor cache capable of storing a subset of memory contents of the cached computer memory, that include: attempting, by the processor, to retrieve portions of the memory contents of the cached computer memory from the processor cache, resulting in cache misses for the processor cache; tracking, by the processor, cache miss statistics for the processor cache in the computing system, the cache miss statistics describing the cache misses for the processor cache; and administering a thermal management device for the computing system in dependence upon the cache miss statistics, the thermal management device operatively coupled to the processor and capable of managing temperature for the computing system.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
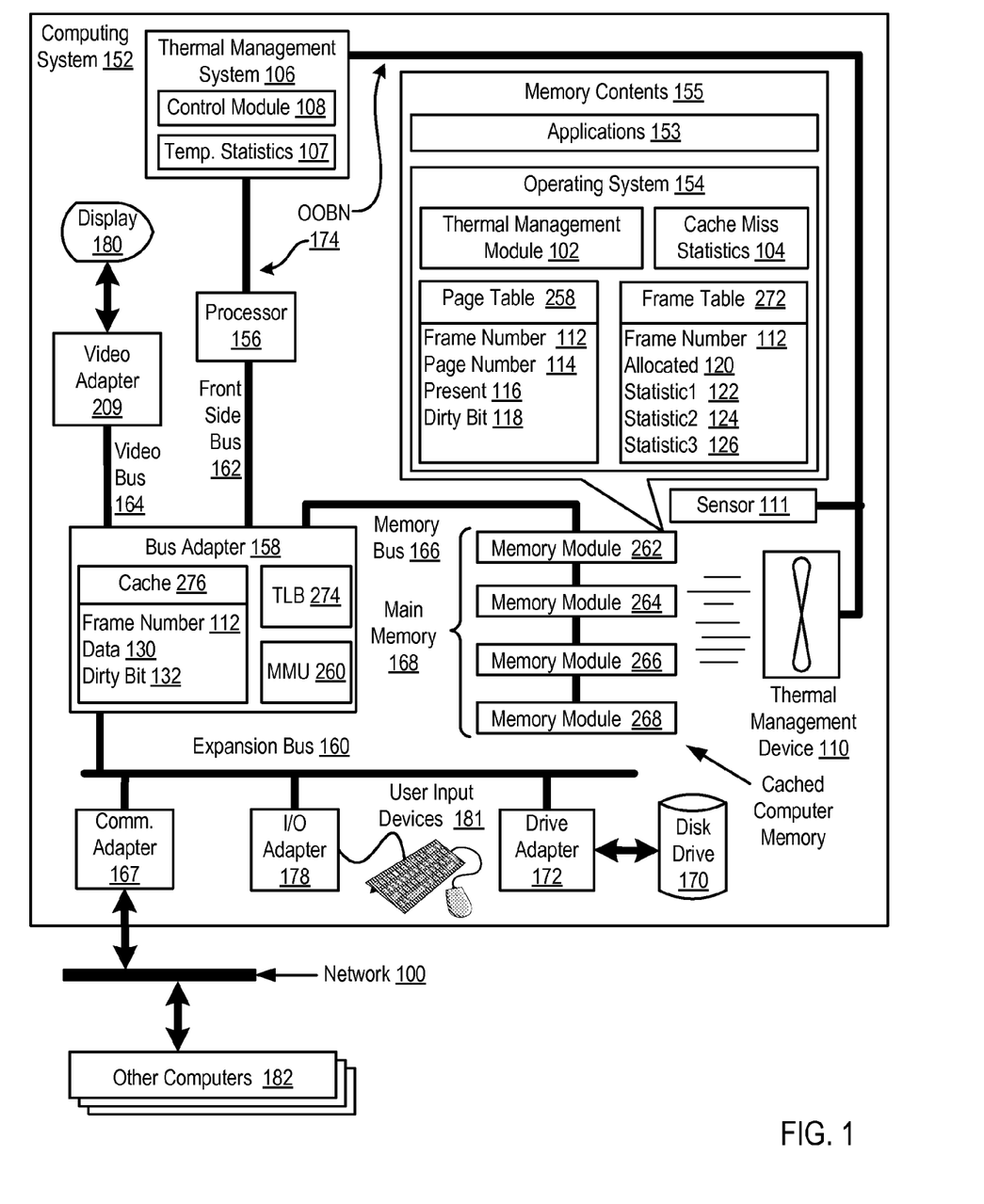
FIG. 1 sets forth a block diagram of an exemplary computing system useful for preemptive thermal management for a computing system based on cache performance according to embodiments of the present invention.

Exemplary methods, apparatus, and products for preemptive thermal management for a computing system based on cache performance in accordance with the present invention are described with reference to the accompanying drawings, beginning with FIG. 1. FIG. 1 sets forth a block diagram of automated computing machinery comprising an exemplary computing system (152) useful in preemptive thermal management for a computing system based on cache performance according to embodiments of the present invention. The computing system (152) of FIG. 1 includes at least one computer processor (156) and cached computer memory (168) implemented as main memory (168) operatively coupled through a memory bus (166) to processor (156) and to other components of the computer (152). The main memory (168) is implemented as random access memory ('RAM') in four memory modules (262, 264, 266, 268). A memory module is a group of RAM integrated circuits mounted on a printed circuit board. A memory module may be implemented as a single in-line memory module ('SIMM'), dual in-line memory module ('DIMM'), and in other form factors as will occur to those of skill in the art.

The computing system (152) of FIG. 1 also includes a processor cache (276) operatively coupled to the processor (156). The processor cache (276) is capable of storing a subset of memory contents (155) of the cached main memory (168) for faster access by the processor (156) than is normally achieved when accessing memory contents from main memory (168) itself. The memory contents (155) of FIG. 1 are stored and organized in frames of physical main memory (168). The processor cache (276) of FIG. 1 is organized as a table in which each cache entry includes a frame number field (112), a data field (130), and a dirty bit field (132). The frame number field (112) specifies the particular frame in main memory (168) that is cached in the processor cache (276). The data field (130) stores the memory contents of the frame specified by the frame number field (112). The dirty bit field (132) indicates whether the memory contents stored in the data field (130) have been modified after the frame was loaded into the processor cache (276).

As mentioned above, the exemplary computing system (152) of FIG. 1 operates generally for preemptive thermal management based on cache performance according to embodiments of the present invention. The exemplary computing system (152) operates generally for preemptive thermal management based on cache performance according to embodiments of the present invention by: attempting, by the processor (156), to retrieve portions of the memory contents (155) of the cached computer memory (168) from the processor cache (276), resulting in cache misses for the processor cache (276); tracking, by the processor (156), cache miss statistics (104) for the processor cache (276) in the computing system (152), the cache miss statistics (104) describing the cache misses for the processor cache (276); and administering a thermal management device (110) for the computing system (152) in dependence upon the cache misses, the thermal management device (110) operatively coupled to the processor (156) and capable of managing temperature for the computing system (152).

A cache miss occurs when the processor (156) attempts to retrieve a portion of the memory contents (155) of the cached computer memory (168) from the processor cache (276) and the particular contents are not stored in the cache (276). As such, the processor must retrieve that portion of the memory contents (155) from the cached computer memory (168) itself, not from the processor cache (276). Because large numbers of cache misses typically increase the overall thermal energy for the computing system (152), preemptive thermal management based on cache performance according to embodiments of the present invention allows the computing system (152) to preemptively cool the computing system before significant temperature increases actually occur.

The exemplary computing system (152) of FIG. 1 also includes a thermal management system (106). The thermal management system (106) of FIG. 1 is composed of various hardware and software components such as, for example, a microcontroller and non-volatile memory, that is capable of administering thermal management devices and sensors to manage the thermal environment of the computing system (152). The thermal management system (106) has installed upon it a control module (108), a set of computer program instructions for preemptive thermal management for a computing system based on cache performance according to embodiments of the present invention. The control module (108) may operate generally for preemptive thermal management for a computing system based on cache performance according to embodiments of the present invention by controlling a thermal management device (110) in dependence upon a thermal control signal received from the processor (156). In other embodiments, the control module (108) may operate generally for preemptive thermal management for a computing system based on cache performance according to embodiments of the present invention by polling for the cache miss statistics (104) for the processor cache (276) from the processor (156) and controlling the thermal management device (110) in dependence upon the cache miss statistics (104).

The thermal management device (110) of FIG. 1 is implemented as a cooling fan that directs cooler ambient air over the memory modules (262, 264, 266, 268). Readers will note, however, that such a limitation is for explanation only and not for limitation. In other embodiments, the thermal management device (110) may be implemented as a liquid metal cooling system, water cooling system, phase change cooling system, or any other thermal management device as will occur to those of skill in the art.

In addition to administering the thermal management device (110) of FIG. 1, the control module (108) may also operate generally for preemptive thermal management for a computing system based on cache performance according to embodiments of the present invention by tracking temperature statistics (107) for the computing system (152) after the thermal management device (110) is administered, the temperature statistics describing the temperature for the computing system (152), and altering any subsequent administration of the thermal management device (110) in dependence upon the temperature statistics (107). The control module (108) may receive temperature statistics (107) from a temperature sensor (111). Using the temperature statistics (107), the control module (107) may determine the effectiveness of the previous administration of the thermal management device (110) in managing the computing system's temperature. In the example of FIG. 1, the temperature sensor (111) may be implemented using one or more thermistors, Infrared thermometers, or semiconductor thermometers, but such implementations are for explanation only and not for limitation.

The thermal management system (106) of FIG. 1 is operatively coupled to the processor (156), the temperature sensor (111), and the thermal management device (110) through an out-of-band network ('OOBN') (174). The OOBN (174) of FIG. 1 may be implemented as an I²C bus, for example, a multi-master serial computer bus invented by Philips that is used to attach low-speed peripherals to a motherboard or an embedded system. I²C is a simple, low-bandwidth, short-distance protocol that employs only two bidirectional open-drain lines, Serial Data (SDA) and Serial Clock (SCL), pulled up with resistors. Readers will note, however, that such an implementation is for explanation and not for limitation. In addition to the I²C protocol, the OOBN (174) may be implemented using other technologies as will occur to those of ordinary skill in the art, including for example, technologies described in the Intelligent Platform Management Interface ('IPMI') specification, the System Management Bus ('SMBus') specification, the Joint Test Action Group ('JTAG') specification, and so on. Readers will note that although the thermal management system (106) is illustrated as a stand-alone component of the computing system, the thermal management system (106) may be integrated into other components providing other functionality for the computing system (152) such as, for example, a baseboard management controller ('BMC'). A BMC is a specialized microcontroller that may be embedded on the motherboard of a computer to manage the interface between system management software and the platform hardware.

In the exemplary computing system (152) of FIG. 1, the memory contents (155) include applications (153) and an operating system (154). The applications (155) of FIG. 1 are sets of computer program instructions for user-level data processing supported by the operating system (154). Operating systems that may be improved for preemptive thermal management for a computing system based on cache performance according to embodiments of the present invention include UNIX™, Linux™, Microsoft XP™, IBM's AIX™, IBM's i5/OS™, and others as will occur to those of skill in the art. The operating system (154) in the example of FIG. 1 is shown in main memory (168), but many components of such software typically are stored in non-volatile memory also, such as, for example, on a disk drive (170).

The operating system (154) of FIG. 1 includes a thermal management module (102), a page table (258), and a frame table (272). The thermal management module (102) of FIG. 1 is a set of computer program instructions that operate generally for preemptive thermal management for a computing system based on cache performance according to embodiments of the present invention. The thermal management module (102) operates generally for preemptive thermal management for a computing system based on cache performance according to embodiments of the present invention by: attempting to retrieve portions of the memory contents (155) of the cached computer memory (168) from the processor cache (276), resulting in cache misses for the processor cache (276); tracking cache miss statistics (104) for the processor cache (276) in the computing system (152), the cache miss statistics (104) describing the cache misses for the processor cache (276); and administering a thermal management device (110) for the computing system (152) in dependence upon the cache misses. The thermal management module (102) of FIG. 1 may administering a thermal management device (110) for the computing system (152) in dependence upon the cache misses by determining a thermal control signal in dependence upon the cache miss statistics (104) and a thermal control table and transmitting the thermal control signal to a thermal management system.

The page table (258) of FIG. 1 is used by a virtual memory system in the operating system (154) to store a mapping between virtual memory addresses and physical memory addresses in main memory. The mapping between virtual addresses and physical addresses in the example of FIG. 1 is represented by virtual address page numbers (114) and physical address frame numbers (112) respectively. The page table (258) in the exemplary computer (152) of FIG. 1 also includes additional information about a memory page, such as, for example, whether the memory page is presently in RAM (168). Whether the page is presently in RAM is represented in this example by a present bit (116) on each entry in the page table. The example page table in FIG. 1 also includes, in the form of a dirty bit (118) an indication whether a page has been modified after the page was loaded into RAM (168). A memory page that has been modified is written back to a disk (170) in order to preserve any changes. Readers will note that the exemplary page table (258) of FIG. 1 is for explanation and not for limitation. Other page tables having other formats as will occur to those of skill in the art may also be useful in preemptive thermal management for a computing system based on cache performance according to embodiments of the present invention.

The frame table (272) of FIG. 1 is also used by a virtual memory system in the operating system (154). The frame table (272) records which frames of physical memory are free to be mapped to pages of virtual memory using an allocated bit (120). A frame of physical memory is allocated when the frame is mapped to a page of virtual memory, and a frame of physical memory is unallocated when the frame is not mapped to a page of virtual memory. In some operating systems the frame table (272) may also hold additional information, such as, for example, statistical information, or other background information. Such statistical information may be implemented as, for example, the number of times that a frame is accessed, an indication of when the frame was last accessed, and so on. The statistical information may be stored in the frame table (272) as statistic1 (122), statistic2 (124), and statistic3 (126) associated with the frame number (112). Readers will note that the exemplary frame table (272) of FIG. 1 is for explanation and not for limitation. Other frame tables having other formats as will occur to those of skill in the art may also be useful in preemptive thermal management for a computing system based on cache performance according to embodiments of the present invention.

When accessing memory using the virtual address space, the processor (156) of FIG. 1 utilizes a memory management unit ('MMU') (260) and a translation look-a-side buffer ('TLB') (274) configured in a bus adapter (158). The TLB (274) of FIG. 1 is a table that stores a subset of the entries in the page table (258), typically the most recently accessed entries in the page table (258) by the virtual memory subsystem, for faster access than is normally achieved when accessing entries directly from the page table (258).

The MMU (260) of FIG. 1 is a computer component responsible for handling access requests by the processor (156) to the computing system's memory (168). The MMU (260) performs translation of virtual addresses to physical addresses, memory protection, cache control, bus arbitration, and so on. The MMU (260) performs this translation process by identifying the virtual memory page number using the most significant bits of the virtual memory address and looking up the frame number that corresponds with the page number in the TLB (274). The least significant bits of the virtual memory address form an offset, which when appended to the page number's corresponding frame number form the physical memory address. If the MMU (260) does not locate the page number in the TLB (274), then the MMU (260) looks up the frame number that corresponds with the page number in the page table (258). After identifying the frame number, the MMU (260) determines whether the content of the frame specified by the frame number are located in the processor cache (276). If the content of the frame specified by the frame number are located in the processor cache (276), the MMU (260) provides the frame contents to the processor (156) from the cache (276). A cache miss occurs when the content of the frame specified by the frame number are not located in the cache (276). When a cache miss occurs the MMU (260) either provides the frame contents to the processor (156) from main memory (168) or triggers a page fault interrupt to have the operating system retrieving the frame contents from disk (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computer (152) in the form of disk drive (170). Disk drive adapters useful in computers for preemptive thermal management for a computing system based on cache performance according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for preemptive thermal management for a computing system based on cache performance according to embodiments of the present invention include modems for wired dial-up communications, Ethernet (IEEE 802.3) adapters for wired data communications network communications, and 802.11 adapters for wireless data communications network communications.

The arrangement components making up the exemplary computer (152) illustrated in FIG. 1 are for explanation, not for limitation. Computers useful according to various embodiments of the present invention may include additional components, data communications buses, or other computer architectures, not shown in FIG. 1, as will occur to those of skill in the art. In such a manner, various embodiments of the present invention may be implemented on a variety of hardware platforms in addition to those illustrated in FIG. 1.

As mentioned above, the cached computer memory described with reference to FIG. 1 is implemented as main memory (168), that is RAM external to the processor and configured on memory modules (262, 264, 266, 268). As such, the processor cache (276) caches memory contents from main memory. Readers will note, however, that implementing cached computer memory as main memory is for explanation only and not for limitation. In some other embodiments having a plurality of caches for the processor, the cached computer memory may be implemented as a higher level cache, which in turn is cached by a lower level cache. For example, the cached computer memory from which the processor attempts to retrieve memory contents may be a Level 3 cache that is, in turn, cached by a Level 2 cache. Attempting to retrieve Level 3 cache memory contents from the Level 2 cache may often result in cache misses that may be tracked and used to administer a thermal management device to provide preemptive thermal management according to embodiments of the present invention.

Figure 2:
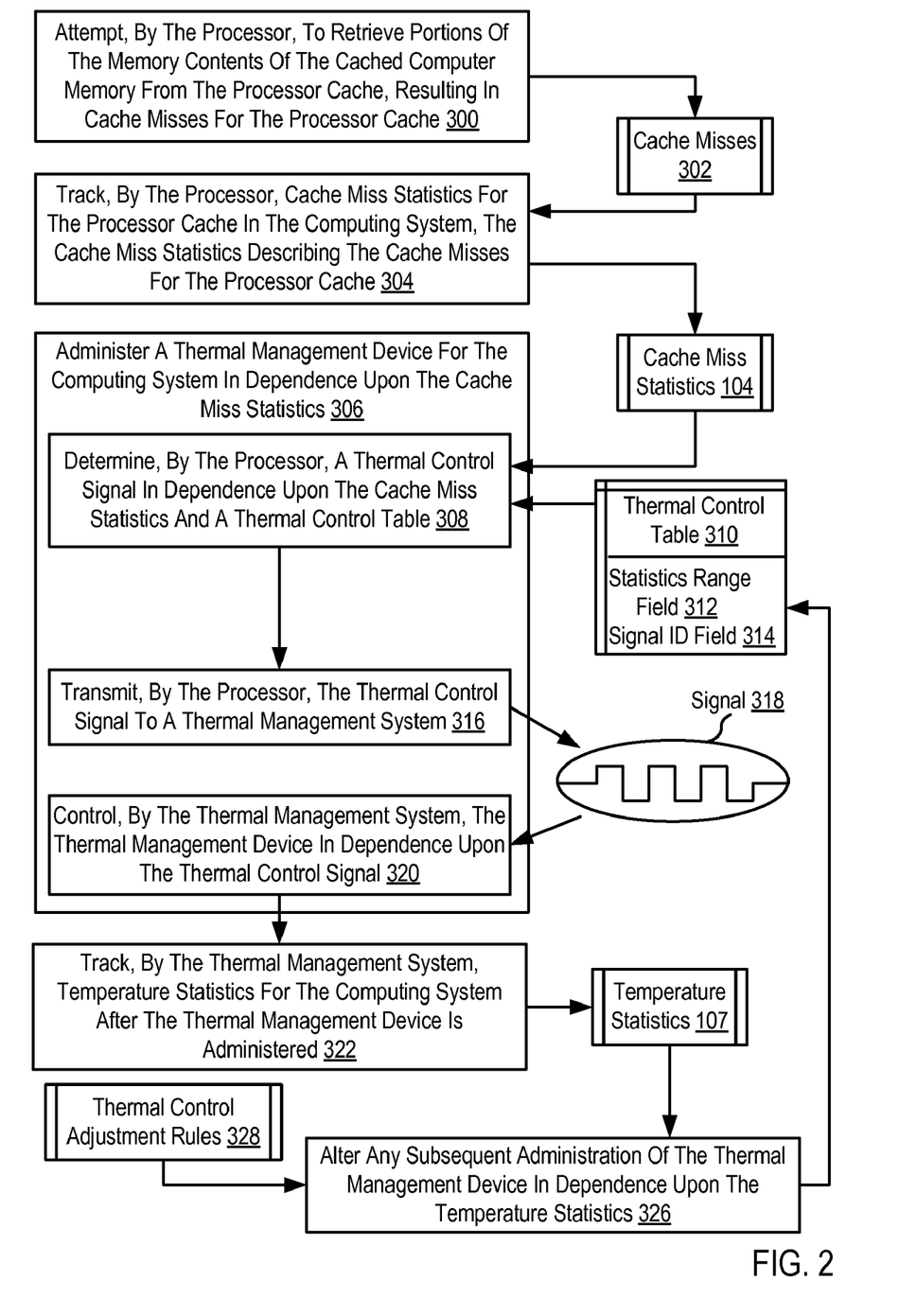
FIG. 2 sets forth a flow chart illustrating an exemplary method of preemptive thermal management for a computing system based on cache performance according to embodiments of the present invention.

For further explanation, FIG. 2 sets forth a flow chart illustrating an exemplary method for preemptive thermal management for a computing system based on cache performance according to embodiments of the present invention. The computing system described with reference to FIG. 2 has a processor, cached computer memory operatively coupled to the processor, and a processor cache operatively coupled to the processor. The processor cache is capable of storing a subset of memory contents of the cached computer memory.

The method of FIG. 2 includes attempting (300), by the processor, to retrieve portions of the memory contents of the cached computer memory from the processor cache, resulting in cache misses (302) for the processor cache. The processor may attempt (300) to retrieve portions of the memory contents of the cached computer memory from the processor cache according to the method of FIG. 2 by instructing an MMU to retrieve the memory contents of a particular page in virtual memory space. The MMU translates the virtual memory page number into a physical frame number of the cached computer memory and attempts to retrieve the memory contents for that frame number from the processor cache. When the memory contents specified by that frame number are not located in the processor cache, a cache miss (302) occurs.

The method of FIG. 2 also includes tracking (304), by the processor, cache miss statistics (104) for the processor cache in the computing system. The cache miss statistics (104) of FIG. 2 describe the cache misses (302) for the processor cache. The processor may track (304) the cache miss statistics (104) for the processor cache in the computing system according to the method of FIG. 2 by counting the number of cache misses (302) that occur with a predetermined time period such as, for example, one second, ten seconds, or any other predetermined time period as will occur to those of skill in the art. The processor may also track (304) the cache miss statistics (104) for the processor cache in the computing system according to the method of FIG. 2 by monitoring the percentage of memory access attempts from the processor cache that result in a cache miss.

The method of FIG. 2 administering (306) a thermal management device for the computing system in dependence upon the cache miss statistics (104). The thermal management device is operatively coupled to the processor and capable of managing temperature for the computing system. The thermal management device may be implemented as a cooling fan that directs ambient air external over the computing system's components, a liquid metal cooling system, water cooling system, phase change cooling system, or any other thermal management device as will occur to those of skill in the art. In many embodiments, the thermal manage device is controlled by a thermal management system. The thermal management system may control the thermal management device based on information retrieved from the device itself or other components in the computing system.

Administering (306) a thermal management device for the computing system in dependence upon the cache miss statistics (104) according to the method of FIG. 2 includes determining (308), by the processor, a thermal control signal (318) in dependence upon the cache miss statistics (104) and a thermal control table (310) and transmitting (316), by the processor, the thermal control signal (318) to a thermal management system. The thermal control signal (318) may be implemented as a duty cycle signal, control codes, packetized instructions, a direct current voltage level, or any other signal as will occur to those of skill. The thermal control table (310) of FIG. 2 is a data structure that associates thermal control signals with cache miss statistic ranges. Each entry in the thermal control table (310) of FIG. 2 includes a statistics range field (312) and a signal identifier field (314). The signal identifier field (314) of FIG. 2 specifies a particular thermal control signal used to instruct a thermal management system to administer a thermal management device in a particular manner such as, for example, to increase cooling or to decrease cooling. The statistics range field (312) of FIG. 2 specifies a particular range of cache miss statistics that correspond to the associated thermal control signal. The information contained in the thermal control table is typically stored in the computing system's non-volatile computer memory and is initially generated by the computing system's designer, technician, or manufacturer. The processor may determine (308) the thermal control signal (318) according to the method of FIG. 2 by identifying the statistics range from the thermal control table (310) that match the cache miss statistics (104) and identifying the thermal control signal (318) associated with that identified statistics range.

For further explanation, consider the following exemplary thermal control table:

TABLE 1

EXEMPLARY THERMAL CONTROL TABLE

| STATISTICS RANGE FIELD | SIGNAL ID FIELD |
|---|---|
| 0-99 cache misses per second | Low_Cooling_Signal_ID |
| 100-999 cache misses per second | Medium_Cooling_Signal_ID |
| 1000-9999 cache misses per second | High_Cooling_Signal_ID |

In the exemplary thermal control table above, the first record associates an identifier for a thermal control signal that instructs the thermal management device to provide a low level of cooling when cache miss statistics indicate that 0-99 cache misses occur per second. The second record associates an identifier for a thermal control signal that instructs the thermal management device to provide a medium level of cooling when cache miss statistics indicate that 100-999 cache misses occur per second. The third record associates an identifier for a thermal control signal that instructs the thermal management device to provide a high level of cooling when cache miss statistics indicate that 1000-9999 cache misses occur per second. Readers will note that the exemplary thermal control table above is for explanation only and not for limitation.

Administering (306) a thermal management device for the computing system in dependence upon the cache miss statistics (104) according to the method of FIG. 2 also includes controlling (320), by the thermal management system, the thermal management device in dependence upon the thermal control signal (318). The thermal management system may control (320) the thermal management device according to the method of FIG. 2 by identifying a device action associated with the thermal control signal and carrying out the identified device action. For example, if the thermal control signal specifies instructing the thermal management device to provide a low amount of cooling based on the current cache miss statistics, then the thermal management system may modify the fan speed in a thermal management device implemented as a cooling fan. When the thermal management device is implemented as a liquid metal cooling system, the thermal management system may modify the flow rate of the liquid metal in response to the thermal control signal.

The method of FIG. 2 also includes tracking (322), by the thermal management system, temperature statistics (107) for the computing system after the thermal management device is administered (306). The temperature statistics (107) of FIG. 2 describe the temperature for the computing system. The thermal management system may track (322) temperature statistics (107) for the computing system after the thermal management device is administered (306) according to the method of FIG. 2 by monitoring the temperature levels of the computing system using temperature sensors such as, for example, thermistors, Infrared thermometers, or semiconductor thermometers.

The method of FIG. 2 also includes altering (326), by the thermal management system, any subsequent administration of the thermal management device in dependence upon the temperature statistics (107). The thermal management system may alter (326) subsequent administration of the thermal management device in dependence upon the temperature statistics (107) according to the method of FIG. 2 by adjusting the associations stored in the thermal control table (310) in dependence upon thermal control adjustment rules (328). Thermal control adjustment rules (328) specify the manner in which the thermal control table (310) is altered based on the temperature statistics (107). For example, consider that the temperature statistics (107) indicate that the temperature level of the computing system rose ten degrees Celsius even after administering (306) the thermal management device in response to the cache misses. In such an example, thermal control adjustment rules may specify decreasing the threshold between each statistic range in the thermal control table (310) by ten percent. Applying such a thermal control adjustment rule to the exemplary thermal control table 1 above results in the following exemplary thermal control table:

TABLE 2

EXEMPLARY THERMAL CONTROL TABLE

| STATISTICS RANGE FIELD | SIGNAL ID FIELD |
|---|---|
| 0-89 cache misses per second | Low_Cooling_Signal_ID |
| 100-899 cache misses per second | Medium_Cooling_Signal_ID |
| 1000-9999 cache misses per second | High_Cooling_Signal_ID |

In the exemplary thermal control table above, the first record associates an identifier for a thermal control signal that instructs the thermal management device to provide a low level of cooling when cache miss statistics indicate that 0-89 cache misses occur per second. The second record associates an identifier for a thermal control signal that instructs the thermal management device to provide a medium level of cooling when cache miss statistics indicate that 100-899 cache misses occur per second. The third record associates an identifier for a thermal control signal that instructs the thermal management device to provide a high level of cooling when cache miss statistics indicate that 1000-9999 cache misses occur per second. In such a manner, a higher level of cooling would be provided at lower cache miss statistics levels than previously specified in the exemplary thermal control table 1 above. Readers will note that the exemplary thermal control table above is for explanation only and not for limitation.

The explanation above with reference to FIG. 2 describes a processor that utilizes cache miss statistics (104) to instruct a thermal management system to control a thermal management device. In some other embodiments, the thermal management system may itself utilize the cache miss statistics (104) in controlling the thermal management device. For further explanation, consider FIG. 3 that sets forth a flow chart illustrating a further exemplary method for preemptive thermal management for a computing system based on cache performance according to embodiments of the present invention.

Figure 3:
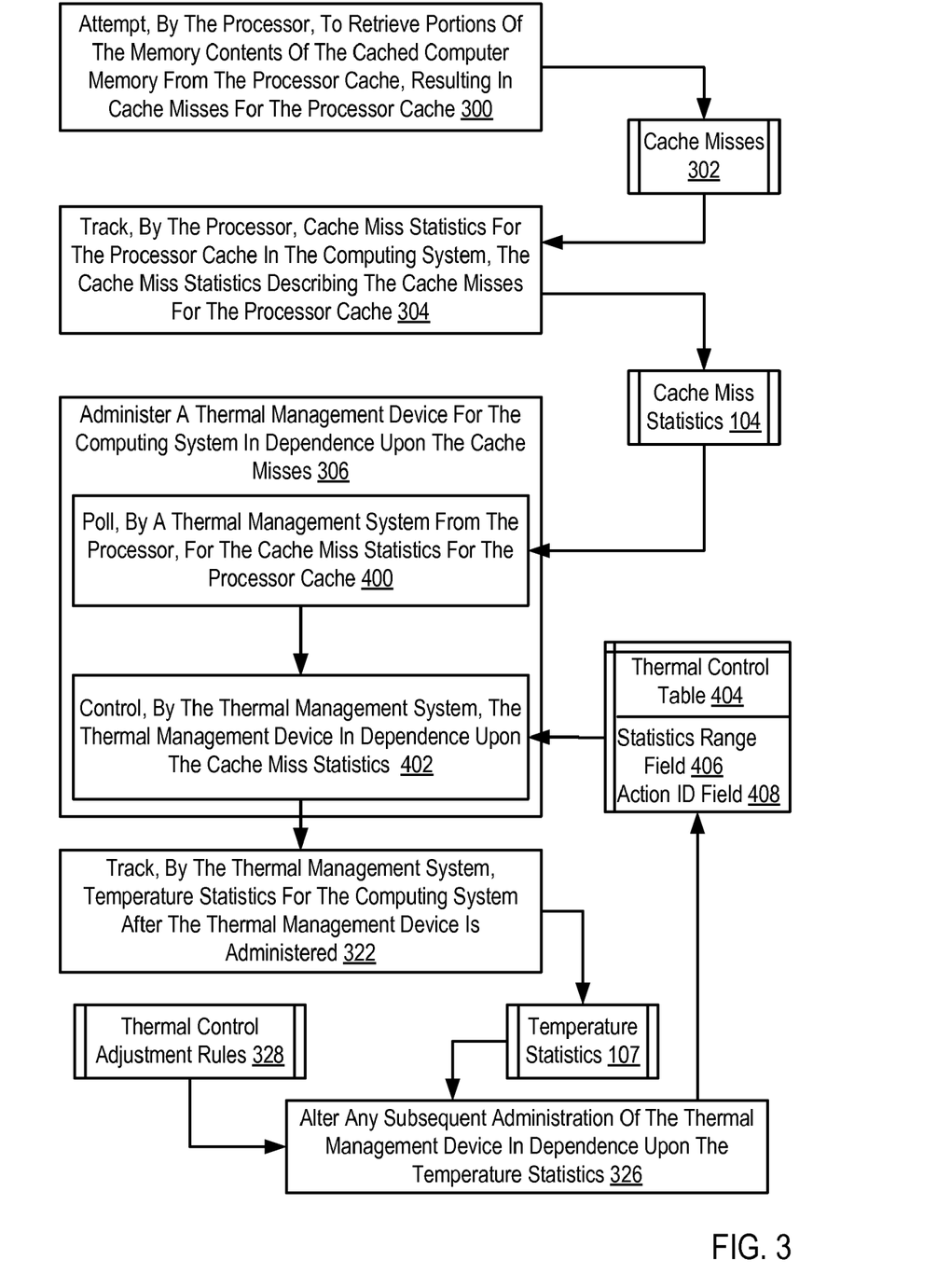
FIG. 3 sets forth a flow chart illustrating a further exemplary method of preemptive thermal management for a computing system based on cache performance according to embodiments of the present invention.

The method of FIG. 3 is similar to the method of FIG. 2. That is, the method of FIG. 3 includes: attempting (300), by the processor, to retrieve portions of the memory contents of the cached computer memory from the processor cache, resulting in cache misses (302) for the processor cache; tracking (304), by the processor, cache miss statistics (104) for the processor cache in the computing system, the cache miss statistics (104) describing the cache misses (302) for the processor cache; and administering (306) a thermal management device for the computing system in dependence upon the cache miss statistics (104), the thermal management device operatively coupled to the processor and capable of managing temperature for the computing system.

Administering (306) a thermal management device for the computing system in dependence upon the cache miss statistics (104) according to the method of FIG. 3 includes polling (400), by the thermal management system from the processor, for the cache miss statistics (104) for the processor cache. The thermal management system may poll (400) for the cache miss statistics (104) according to the method of FIG. 3 by retrieving the cache miss statistics (104) directly from the memory address at which the cache miss statistics (104) are stored. In some other embodiments, the thermal management system may poll (400) for the cache miss statistics (104) according to the method of FIG. 3 by triggering a processor interrupt and requesting that the processor provide the thermal management system with the current cache miss statistics.

Administering (306) a thermal management device for the computing system in dependence upon the cache miss statistics (104) according to the method of FIG. 3 includes controlling (402), by the thermal management system, the thermal management device in dependence upon the cache miss statistics (104). The thermal management system may control (402) the thermal management device in dependence upon the cache miss statistics (104) according to the method of FIG. 3 by identifying the statistics range from a thermal control table (404) that match the cache miss statistics (104) and identifying the action associated with that identified statistics range. The thermal control table (404) of FIG. 4 is a data structure that associates actions to administer thermal management devices with cache miss statistic ranges. Each entry in the thermal control table (404) of FIG. 3 includes a statistics range field (406) and an action identifier field (408). The action identifier field (408) of FIG. 3 specifies a particular action for the thermal management system to perform to control a thermal management device in a particular manner such as, for example, to increase cooling or to decrease cooling. The statistics range field (406) of FIG. 3 specifies a particular range of cache miss statistics that correspond to the associated action identifier. The information contained in the thermal control table (404) is typically stored in the computing system's non-volatile computer memory and is initially generated by the computing system's designer, technician, or manufacturer.

For further explanation, consider the following exemplary thermal control table:

TABLE 3

EXEMPLARY THERMAL CONTROL TABLE

| STATISTICS RANGE FIELD | ACTION ID FIELD |
| --- | --- |
| 0-99 cache misses per second | Low_Cooling_Level_Action_ID |
| 100-999 cache misses per second | Medium_Cooling_Level_Action_ID |
| 1000-9999 cache misses per second | High_Cooling_Level_Action_ID |

In the exemplary thermal control table above, the first record associates an identifier for an action performed by thermal management system that places a thermal management device in a state that provides a low cooling level with cache miss statistics range of 0-99 cache misses per second. In such a manner, when the thermal management system receives a cache miss statistic that falls within the cache miss statistics range of 0-99 cache misses per second, the thermal management system places the thermal management device in a state that provides a low level of cooling. The second record associates an identifier for an action performed by thermal management system that places a thermal management device in a state that provides a medium cooling level with cache miss statistics range of 100-999 cache misses per second. In such a manner, when the thermal management system receives a cache miss statistic that falls within the cache miss statistics range of 100-999 cache misses per second, the thermal management system places the thermal management device in a state that provides a medium level of cooling. The third record associates an identifier for an action performed by thermal management system that places a thermal management device in a state that provides a high cooling level with cache miss statistics range of 1000-9999 cache misses per second. In such a manner, when the thermal management system receives a cache miss statistic that falls within the cache miss statistics range of 1000-9999 cache misses per second, the thermal management system places the thermal management device in a state that provides a high level of cooling. Readers will note that the exemplary thermal control table above is for explanation only and not for limitation.

The method of FIG. 3 also includes tracking (322), by the thermal management system, temperature statistics (107) for the computing system after the thermal management device is administered. The temperature statistics (107) describe the temperature for the computing system. As mentioned above, the thermal management system may track (322) temperature statistics (107) for the computing system after the thermal management device is administered (306) according to the method of FIG. 3 by monitoring the temperature levels of the computing system using temperature sensors such as, for example, thermistors, Infrared thermometers, or semiconductor thermometers.

The method of FIG. 3 also includes altering (326), by the thermal management system, any subsequent administration of the thermal management device in dependence upon the temperature statistics (107). The thermal management system may alter (326) subsequent administration of the thermal management device in dependence upon the temperature statistics (107) according to the method of FIG. 3 by adjusting the associations stored in the thermal control table (404) in dependence upon thermal control adjustment rules (328). As mentioned above, thermal control adjustment rules (328) specify the manner in which the thermal control table (310) is altered based on the temperature statistics (107). Because the thermal control table (310) is typically preconfigured in the computing system at the time the system is installed, altering (326) any subsequent administration of the thermal management device allows the thermal management system to adjust preemptive cooling according to installation-specific environmental factors. For example, the computing system may be installed in a warmer environment than anticipated at the time the computing system was designed. In such an example, adjusting the thermal control table may be advantageous.

Exemplary embodiments of the present invention are described largely in the context of a fully functional computer system for preemptive thermal management for a computing system based on cache performance. Readers of skill in the art will recognize, however, that the present invention also may be embodied in a computer program product disposed on computer media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of preemptive thermal management for a computing system based on cache performance, the computing system having a processor, cached computer memory operatively coupled to the processor, and a processor cache operatively coupled to the processor, the processor cache capable of storing a subset of memory contents of the cached computer memory, the method comprising:

attempting, by the processor, to retrieve portions of the memory contents of the cached computer memory from the processor cache, resulting in cache misses for the processor cache;

tracking, by the processor, cache miss statistics for the processor cache in the computing system, the cache miss statistics describing the cache misses for the processor cache; and administering a thermal management device for the computing system in dependence upon the cache miss statistics, the thermal management device operatively coupled to the processor and capable of managing temperature for the computing system, including:

determining, by the processor, a thermal control signal in dependence upon the cache miss statistics and a thermal control table that maps a plurality of thermal control signals to a plurality of cache miss ranges;

transmitting, by the processor, the thermal control signal to a thermal management system; and controlling, by the thermal management system, the thermal management device in dependence upon the thermal control signal.

2. The method of claim 1 wherein administering a thermal management system for the computing system in dependence upon the cache miss statistics further comprises:

polling, by a thermal management system from the processor, for the cache miss statistics for the processor cache; and controlling, by the thermal management system, the thermal management device in dependence upon the cache miss statistics.

3. The method of claim 1 wherein the cached computer memory is main memory operatively coupled to the processor through a memory bus.

4. The method of claim 1 wherein:

the processor cache is one cache among a plurality of caches for the processor; and the cached computer memory is a higher level cache among the plurality of caches than the processor cache.

5. The method of claim 1 further comprising:

tracking, by the thermal management system, temperature statistics for the computing system after the thermal management device is administered, the temperature statistics describing the temperature for the computing system; and altering, by the thermal management system, any subsequent administration of the thermal management device in dependence upon the temperature statistics.

6. A computing system for preemptive thermal management based on cache performance, the computing system having a processor, cached computer memory operatively coupled to the processor, and a processor cache operatively coupled to the processor, the processor cache capable of storing a subset of memory contents of the cached computer memory, the computing system also comprising computer memory having disposed within it computer program instructions capable of:

attempting, by the processor, to retrieve portions of the memory contents of the cached computer memory from the processor cache, resulting in cache misses for the processor cache;

tracking, by the processor, cache miss statistics for the processor cache in the computing system, the cache miss statistics describing the cache misses for the processor cache; and administering a thermal management device for the computing system in dependence upon the cache miss statistics, the thermal management device operatively coupled to the processor and capable of managing temperature for the computing system, including:

determining, by the processor, a thermal control signal in dependence upon the cache miss statistics and a thermal control table that maps a plurality of thermal control signals to a plurality of cache miss ranges;

transmitting, by the processor, the thermal control signal to a thermal management system; and controlling, by the thermal management system, the thermal management device in dependence upon the thermal control signal.

7. The computing system of claim 6 wherein administering a thermal management system for the computing system in dependence upon the cache miss statistics further comprises:

polling, by a thermal management system from the processor, for the cache miss statistics for the processor cache; and controlling, by the thermal management system, the thermal management device in dependence upon the cache miss statistics.

8. The computing system of claim 6 wherein the cached computer memory is main memory operatively coupled to the processor through a memory bus.

9. The computing system of claim 6 wherein:

the processor cache is one cache among a plurality of caches for the processor; and the cached computer memory is a higher level cache among the plurality of caches than the processor cache.

10. The computing system of claim 6 where the computer memory has disposed within it computer program instructions capable of:

tracking, by the thermal management system, temperature statistics for the computing system after the thermal management device is administered, the temperature statistics describing the temperature for the computing system; and altering, by the thermal management system, any subsequent administration of the thermal management device in dependence upon the temperature statistics.

11. A computer program product for preemptive thermal management for a computing system based on cache performance, the computing system having a processor, cached computer memory operatively coupled to the processor, and a processor cache operatively coupled to the processor, the processor cache capable of storing a subset of memory contents of the cached computer memory, the computer program product disposed in a computer readable recordable medium, the computer program product comprising computer program instructions capable of:

attempting, by the processor, to retrieve portions of the memory contents of the cached computer memory from the processor cache, resulting in cache misses for the processor cache;

tracking, by the processor, cache miss statistics for the processor cache in the computing system, the cache miss statistics describing the cache misses for the processor cache; and administering a thermal management device for the computing system in dependence upon the cache miss statistics, the thermal management device operatively coupled to the processor and capable of managing temperature for the computing system, including:

determining, by the processor, a thermal control signal in dependence upon the cache miss statistics and a thermal control table that maps a plurality of thermal control signals to a plurality of cache miss ranges;

transmitting, by the processor, the thermal control signal to a thermal management system; and controlling, by the thermal management system, the thermal management device in dependence upon the thermal control signal.

12. The computer program product of claim 11 wherein administering a thermal management system for the computing system in dependence upon the cache miss statistics further comprises:

polling, by a thermal management system from the processor, for the cache miss statistics for the processor cache; and controlling, by the thermal management system, the thermal management device in dependence upon the cache miss statistics.

13. The computer program product of claim 11 wherein the cached computer memory is main memory operatively coupled to the processor through a memory bus.

14. The computer program product of claim 11 wherein:

the processor cache is one cache among a plurality of caches for the processor; and the cached computer memory is a higher level cache among the plurality of caches than the processor cache.

15. The computer program product of claim 11 further comprising computer program instructions capable of:

tracking, by the thermal management system, temperature statistics for the computing system after the thermal management device is administered, the temperature statistics describing the temperature for the computing system; and altering, by the thermal management system, any subsequent administration of the thermal management device in dependence upon the temperature statistics.

* * * * *